US007889758B2

(12) United States Patent
Li et al.

(10) Patent No.: US 7,889,758 B2
(45) Date of Patent: Feb. 15, 2011

(54) METHOD FOR ALLOCATING SUBCHANNEL IN WIRELESS NETWORK

(75) Inventors: Lei Li, Beijing (CN); Zhisheng Niu, Beijing (CN); Takashi Yano, Tokyo (JP); Shiro Tanabe, Tokyo (JP); Satoshi Tamaki, Tokyo (JP)

(73) Assignee: Tsinghua University, Beijing (CN)

( * ) Notice: Subject to any disclaimer, the term of this patent is extended or adjusted under 35 U.S.C. 154(b) by 1497 days.

(21) Appl. No.: 11/209,739

(22) Filed: Aug. 24, 2005

(65) Prior Publication Data

US 2006/0056451 A1    Mar. 16, 2006

(30) Foreign Application Priority Data

Aug. 27, 2004    (CN) .......................... 2004 1 0068586

(51) Int. Cl.
*H04J 3/00* (2006.01)
*H04J 11/00* (2006.01)
(52) U.S. Cl. ...................................... 370/464; 370/208
(58) Field of Classification Search ................. 370/208, 370/464
See application file for complete search history.

(56) References Cited

U.S. PATENT DOCUMENTS

| | | | |
|---|---|---|---|
| 2002/0105937 A1 | 8/2002 | Takeuchi et al. | |
| 2003/0128658 A1* | 7/2003 | Walton et al. ............... | 370/208 |
| 2010/0119005 A1* | 5/2010 | Agrawal et al. ............. | 375/267 |

FOREIGN PATENT DOCUMENTS

JP    2002-171287    6/2002

OTHER PUBLICATIONS

Pramod Viswanath et al., "Opportunistic Beamforming Using Dumb Antennas", IEEE Transactions on Information Theory, vol. 48, No. 6, Jun. 2002—pp. 1277-1294.
Gerard J. Foschini, "Layered Space-Time Architecture for Wireless Communication in a Fading Environment When Using Multi-Element Antennas", Bell Labs Technical Journal, Autumn 1996—pp. 41-59.
Andreas F. Molisch et al., "Space-Time-Frequency (STF) Coding for MIMO-OFDM Systems", IEEE communications Letters, vol. 6, No. 9, Sep. 2002—pp. 370-372.
Jon C.R. Bennett et al., "Worst-case Fair Weighted Fair Quenceing", 1996 IEEE—pp. 120-128.
Oh-Soon Shin et al., "Antenna-Assisted Round Robin Scheduling for MIMO Cellular Systems", IEEE Communications Letters, Vo. 7, No. 3, Mar. 2003—pp. 109-111.

* cited by examiner

*Primary Examiner*—Derrick W Ferris
*Assistant Examiner*—Angel Brockman
(74) *Attorney, Agent, or Firm*—Antonelli, Terry, Stout & Kraus, LLP.

(57) ABSTRACT

A subchannel scheduling method in a multi-user MIMO-OFDM environment modifies proportional fairness scheduling specifications and maximizes a system throughput under conditions that a minimum data transmission rate required by a multimedia user be ensured. In a method for allocating subchannels in a wireless network, plural users are subscribed in the wireless network, a base station has $N_T$ transmission antennas, a user i has $N_R$ reception antennas, a network capacity determined by the $N_T$ transmission antennas and K subcarrier groups is divided into K transmission subchannel groups, and a network bandwidth determined by the $N_T$ transmission antennas is divided into the K subchannel groups. The base station sequentially allocates channels to the users on the basis of a proportional value of a data transmission rate supported to each user and an average throughput of each user in a predetermined time and a service quality required by each user.

11 Claims, 4 Drawing Sheets

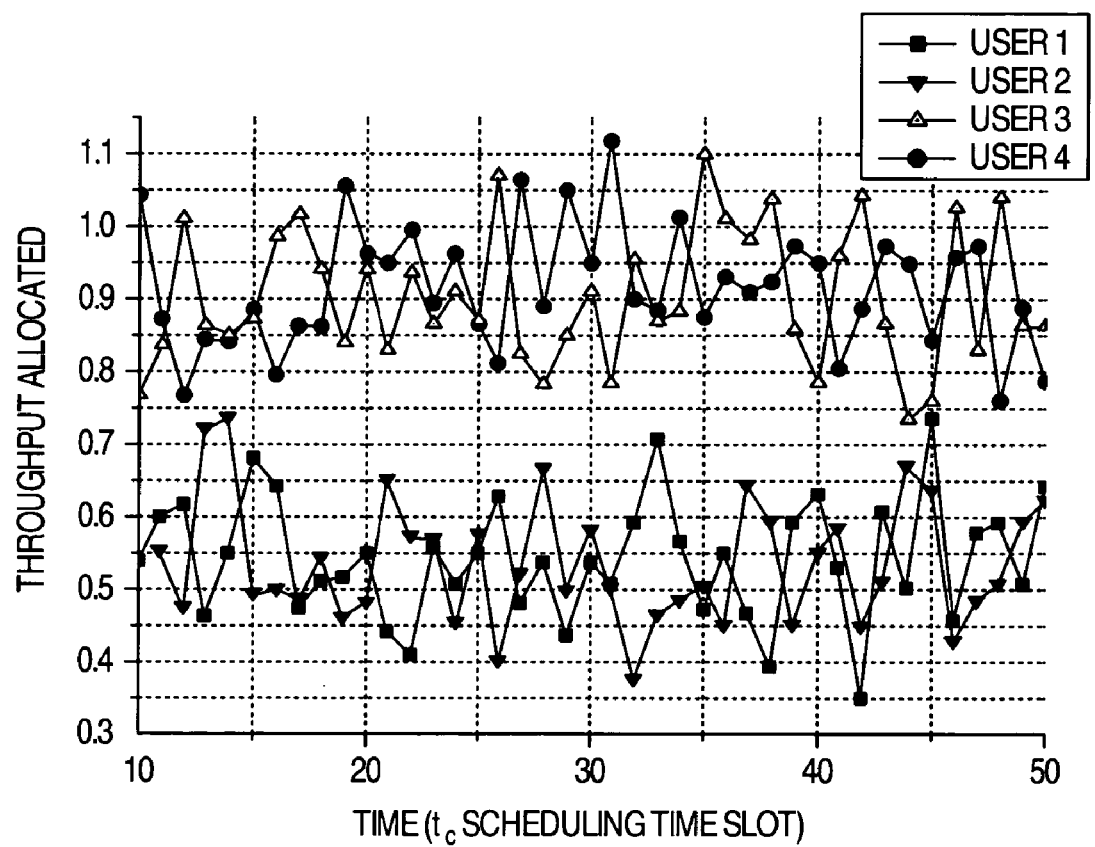

METHOD FOR ALLOCATING SUBCHANNEL IN WIRELESS NETWORK

INCORPORATION BY REFERENCE

The present application claims priority from Chinese patent application No. 200410068586.1 filed on Aug. 27, 2004, the content of which is hereby incorporated by reference into this application.

BACKGROUND OF THE INVENTION

The present invention relates to a network technique and more particularly, to a method for allocating a subchannel in a wireless network.

In a multi-user wireless network, its important challenge is how a base station allocates channels to a plurality of users. First consider conventional scheduling specifications in a wireless network having a plurality of users for a single channel. In general, user channels have different statistical characteristics. Thus, when a channel is allocated always to a user having a highest quality of communication even in a small area according to the scheduling specifications, a system throughput is increased but this is unfair to a user in deep fading. In order to solve the above weak point, proportional fairness scheduling specifications as a compromise among diversity gain, fairness, and system throughput, has been proposed. For the proportional fairness scheduling specifications, refer to P. Viswaanath. David N. Tse and R. Laroia "Opportunistic beamforming using dumb antennas" IEEE Transactions On Information Theory, Vol. 48, June 2002, pp. 1277-1294.

Assume that there is a feedback channel having no error from each user to a base station. Also assume that data transmission rates of a channel currently supportable by N users are denoted by $R_1(n), R_2(n), \ldots,$ and $R_N(n)$, and that average throughputs in a time slot slide window $t_c$ at a time n are denoted by $T_1(n), T_2(n), \ldots,$ and $T_N(n)$. Under this proportional fairness scheduling specifications, the base station transmits data to a user having a maximum proportional value of an equation (1) given below.

$$\frac{R_k(n)}{T_k(n)} \quad (1)$$

In this case, the proportional value shown by the above equation (1) is directly proportional to the data transmission rate and the channel gain supported by a forward link, and is inversely proportional to an average throughput. Thus, when a proportion of user's momentary channel quality to average channel conditions at a time slot $t_c$ is great, the user in question is selected for transmission according to the scheduling specifications. In other words, the competition of users' resources, i.e., channels is carried out on the basis of not the data transmission rate supported directly by the user but the proportional value normalized using each own average throughput.

SUMMARY OF THE INVENTION

However, when it is desired to realize multimedia service with use of the conventional MIMO (Multiple-Input Multiple-Output) and OFDM (Orthogonal Frequency Division Multiplexing) networks, proportional fairness scheduling has two defects which follow.

1. Any of the MIMO, OFDM and MIMO-OFDM systems has a plurality of subchannels, and the subchannels transmit data simultaneously and independently. Therefore, in such an environment, it is necessary to consider users' scheduling and subchannel allocation at the same time. In the conventional proportional fairness scheduling specifications, however, only users' scheduling in a single transmission channel is considered.

2. For multimedia service, QoS's (qualities of service) required by users vary from user to user. The scheduling specifications should provide multimedia users with QoS support at a high resource utilization rate. In the conventional proportional fairness scheduling specifications, however, consideration is paid only to only the fairness of one sort of service, and no consideration is paid to the demand of different QoS's for multimedia users, for example, to a minimum allowable data transmission rate required by each user.

In order to solve the problems in the prior art, the present invention provides a method for scheduling subchannels in an MIMO-OFDM environment having a plurality of users. In this method, the proportional fairness scheduling specifications are modified, and the modified scheduling specifications are applied to GPS (Generalized Processor Sharing) scheduling specifications to maximize the throughput of a system under conditions that a minimum data transmission rate required by a multimedia user be ensured.

For the purpose of realizing the object of the present invention, the present invention employs technical proposals which follow.

The present invention provides a method for allocating subchannels in a wireless network wherein a plurality of users are subscribed in the wireless network, a base station has $N_T$ transmission antennas, a user i has $N_R$ reception antennas, a network capacity determined by the $N_T$ transmission antennas and K subcarrier groups is divided into K transmission subchannel groups, and a network bandwidth determined by the $N_T$ transmission antennas is divided into the K subchannel groups;

wherein the base station sequentially allocates channels to the plurality of users on the basis of a proportional value of a data transmission rate supported to each user and an average throughput of each user in a predetermined time and a service quality required by each user.

A desired service quality of the each user is a minimum allowable data transmission rate of the user.

The subchannel allocation method includes:

a step (a) of calculating a relative weight between the users by the base station on the basis of a minimum allowable data transmission rate $\phi_i$ of each user subscribed in the system in each predetermined time slot 1;

a step (b) of calculating $\phi_i SDR_c^{(i)}/T_i$ for all the users of the entire system by the base station on the basis of a data transmission rate $SDR_c^{(i)}$ supported fro the user i of a current c-th subchannel and an average throughput $T_i$ of each user in a window having a predetermined past length $t_c$;

a step (c) of selecting the user i having a maximum value of $\phi_i SDR_c^{(i)}/T_i$ and allocating the subchannel c to the user i by the base station; and a step (d) of executing the steps (a) to (c) for all channels by the base station.

The weight $\phi_i$ of the user is calculated and stored by the base station and is used as a scheduling weight coefficient.

In the step (b), the base station determines the $SDR_c^{(i)}$ using a correlation between a pattern ID in a pattern table of adaptive modulation and coding (AMC) and the $SDR_c^{(i)}$ on the basis of the pattern ID fed back from each user.

The pattern table of adaptive modulation and coding (AMC) is held by both the base station and the user.

The base station updates the average throughput $T_i$ until all subchannels are allocated after each predetermined time slot 1.

The updating of the average throughput $T_i$ is carried out according to an equation, $$T_i^{(i)} = \left(1 - \frac{1}{t_c}\right) T_i^{(i-1)} + \frac{1}{t_c} \sum_{c=1}^{N_T K} SDR_c^{(i)} \rho_i(c)$$

In the above equation, $\rho_i(c)$ indicates whether or not the subchannel is being used by the user i.

When the number of users in the network is M; the data transmission rate $SDR_c^{(i)}$ supported for the user i of the entire subchannels forms a matrix equation $\Gamma$ which follows. And the base station calculates $\phi_i SDR_c^{(i)}/T_i$ for each element in the equation $\Gamma$ in the step (b), selects a maximum value of $\phi_i SDR_c^{(i)}/T_i$, allocates subchannels having a corresponding column number in the equation $\Gamma$ to users having a corresponding row number in the equation $\Gamma$, and then deletes a corresponding column in the equation $\Gamma$ in the step (c). And the base station returns to the step (c) until all columns are deleted in the equation $\Gamma$ in the step (d), $$\Gamma = \begin{bmatrix} SDR_1^{(1)} & SDR_2^{(1)} & \ldots & SDR_{N_T K}^{(1)} \\ SDR_1^{(2)} & SDR_2^{(2)} & \ldots & SDR_{N_T K}^{(2)} \\ \ldots & \ldots & \ldots & \ldots \\ SDR_1^{(M)} & SDR_2^{(M)} & \ldots & SDR_{N_T K}^{(M)} \end{bmatrix}$$

In the above equation, elements in the i-th row in the matrix equation correspond to data transmission rates supportable for the user i of channels 1 to $N_T K$.

The user determines a pattern of adaptive modulation and coding (AMC) on the basis of a received signal-to-noise ratio SNR, and feeds the pattern ID of the selected AMC pattern back to the base station.

The user feeds only the AMC pattern ID back to the base station to use it as channel state information.

The wireless network is a wireless cellular network.

The wireless network employs techniques of orthogonal frequency division multiplexing (OFDM) and multiple-input multiple-output (MIMO).

In accordance with the present invention, there can be provided a method for scheduling subchannels in a multi-user MIMO-OFDM environment.

Other objects, features and advantages of the invention will become apparent from the following description of the embodiments of the invention taken in conjunction with the accompanying drawings.

BRIEF DESCRIPTION OF THE DRAWINGS

FIG. 6 shows throughput allocation comparison in various situations in accordance with the present invention.

DESCRIPTION OF THE EMBODIMENTS

Explanation will first be made as to the application environment of the present invention.

Figure 1:
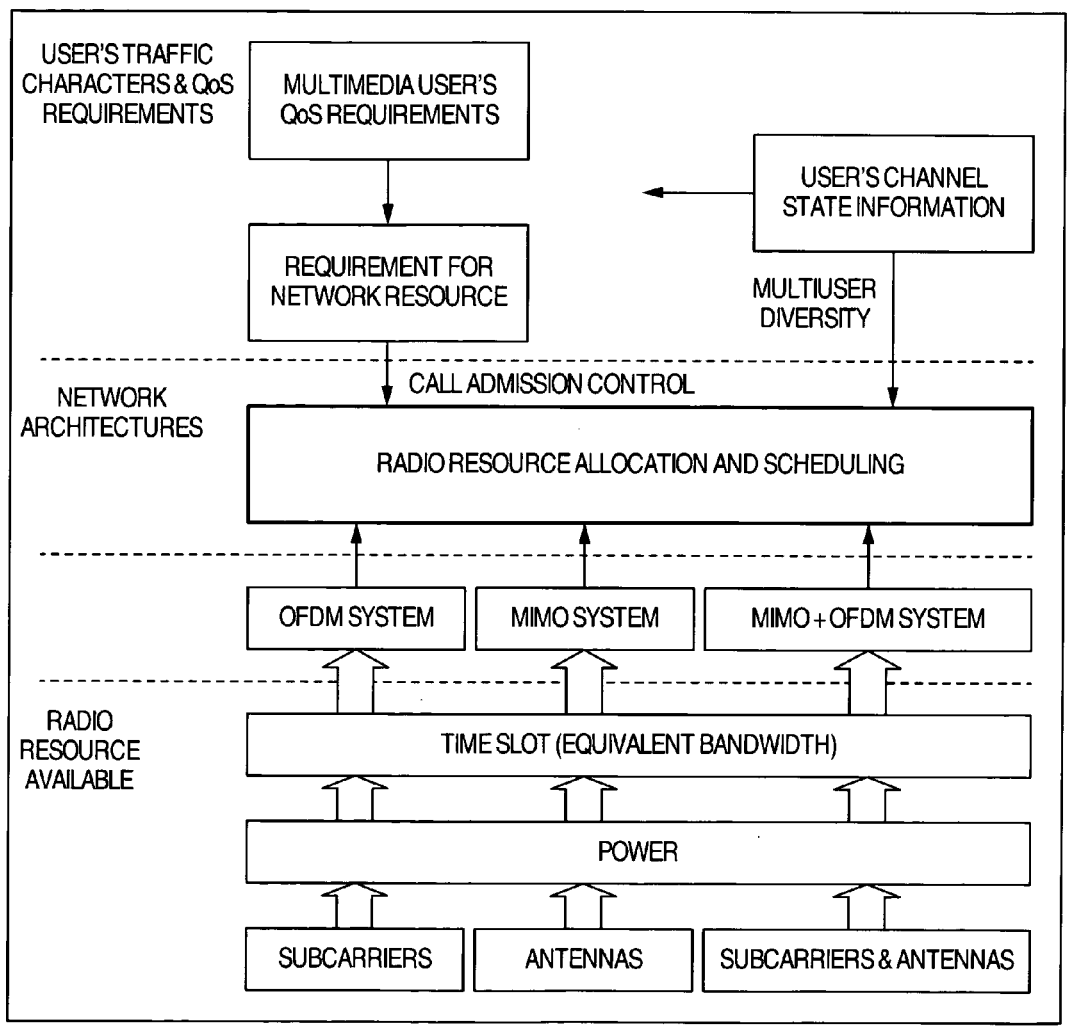
FIG. 1 schematically shows radio resource management of QoS service in an MIMO and OFDM network architecture.

FIG. 1 schematically shows radio resource management of QoS service in an MIMO and OFDM network architecture. As the Internet and a cellular network technique are developed, a requirement of supporting the network connection of multimedia service cannot be avoided everywhere in the country. Unlike conventional audio or data service, the multimedia service requires various service features and QoS. The assurance of the quality of service (QoS) is very importance in multimedia application. In a current wired network, it becomes already difficult to support the multimedia service and to ensure QoS. It is further difficult in a current wireless network to support the multimedia service and to ensure QoS.

When compared with the current network, a next generation wireless network is required to have a higher spectrum efficiency and a higher data transmission rate. As the demand of radio Internet connection is increased, a downlink (from the base station to a user) is required to be able to transmit a large quantity of service data. In past few years, MIMO (Multi-Input Multi-Output) antenna and OFDM (Orthogonal Frequency Division Multiplexing) technique are applied to broadband radio transmission to increase a system capacity and a reliability. When viewed from the viewpoint of radio resource management, radio resources in MAC and network layers after MIMO and OFDM techniques are used can be expanded to all dimensions of time, power, frequency, space, etc., which resources are called multi-dimensional radio resources.

As mentioned above, the multi-dimensional radio resource management is more convenient and effective than the prior art radio resource management.

Let us consider an down environment of a single small area having ($N_T \times N_R$) MIMO antennas and L OFDM subcarriers. Resource scheduling is carried out at the base station. When the L subcarriers are divided into K groups of subcarriers, each having adjacent L/K subcarriers and forming a minimum resource unit to be allocated, the complexity of the scheduling can be reduced. Since adjacent subcarriers have fundamentally the same fading, this is actually possible. Assume that the base station communicates with M users at the same time, and the i-th user has a minimum allowable data transmission rate $R_i$ which is ensured as QoS requirement.

An independent data flow is used to be multiplexed using a plurality of antennas, that is, space multiplexing. This method can be realized by a BLAST technique proposed by G. J. Foschini. For this technique, refer to "Layered space-time architecture for wireless communication in a fading environment when using multi-element antennas" Bell Labs Technical Journal. Vol. 1, No. 2, 1996, pp. 41-59. In order to de-multiplex the space multiplexing, $N_T$ and $N_R$ are required to satisfy a relation, $N_T \leq N_R$. Thus, when $N_T K$ independent data flows are multiplexed and used, $N_T$ transmission antennas and K groups of OFDM subcarriers form a transmission code vector. Transmission power is uniformly allocated to each of subcarriers for each of the transmission antennas, and also is normalized to 1.

Assume that $N_T K$ dimensional column vector s(t) indicates a code transmitted at a time slot t. Hence a corresponding reception code received from the user i is expressed by an equation (2) which follows.

$$x^{(i)}(t) = H^{(i)}(t)s(t) + n^{(i)}(t) \quad (2)$$

where, $n^{(i)}(t)$ is an additional noise vector, $H^{(i)}(t)$ is a channel matrix from an transmission antenna array of the user i to a reception antenna array, which is such an $N_R K_x N_T K$ matrix as expressed by an equation (3) which follows.

$$H^{(i)}(t) = \begin{pmatrix} D_{11}^{(i)}(t) & D_{12}^{(i)}(t) & \ldots & D_{1N_T}^{(i)}(t) \\ D_{21}^{(i)}(t) & D_{22}^{(i)}(t) & \ldots & D_{2N_T}^{(i)}(t) \\ \ldots & \ldots & O & \ldots \\ D_{N_k 1}^{(i)}(t) & D_{N_k 2}^{(i)}(t) & \ldots & D_{N_k N_T}^{(i)}(t) \end{pmatrix} \quad (3)$$

In the equation (3), $D_{pq}^{(i)}(t)$ is a single $K_x K$ block matrix which indicates a channel matrix having K groups of OFDM subcarriers of the user i from a transmission antenna q to a reception antenna p. For example, an element $d_{lm}^{(i)(p-q)}(t)$ in $D_{pq}^{(i)}(t)$ indicates channel coefficients (p=1,2, ..., $N_R$, q=1,2, ..., $N_T$, l,m=1,2, ..., K) from a transmission subcarrier group m of the transmission antenna q to a reception subcarrier group l of the reception antenna p.

When an ideal repeating prefix is used in OFDM, interference between carriers is not generated and $D_{pq}^{(i)}(t)$ becomes a single diagonal matrix. This hypothesis is used even in our examination to be explained later, and a diagonal element in $D_{pq}^{(i)}(t)$ is expressed by $d_k^{(i)(p-q)}(t)$ (k=1,2, ..., K).

When the bandwidth of each subcarrier group is smaller than the coherent bandwidth of the channel, $d_k^{(i)(p-q)}(t)$ is considered to be a complex Gaussian random variable which follows an independent normal distribution, because it follows flat fading.

The radio resource scheduling method is carried out when each scheduling time slot is started. The selection of the length of the scheduling time slot requires assurance that a channel in one scheduling time slot be constant and that the channel be able to be changed in a different scheduling time slot. Since the scheduling method is carried out over a specific time slot, time symbol t is omitted in the following explanation.

In the OFDM system, a broadband signal is divided into several parts, which in turn are modulated to a plurality of narrow band subcarriers. The fading in a frequency band deteriorates the SNR (Signal-to-Noise Ratio) of a subcarrier. However, by improving subcarriers having SNR's exceeding an average SNR, a subcarrier having, e.g., a high SNR can be subjected to high-order modulation and coding. That is, the subcarrier can lower the latent loss of a throughput generated by a subcarrier subjected to AMC (Adaptive Modulation and Coding) fading. AMC can be applied to each subcarrier of OFDM on the basis of fed-back CSI (Channel State Information).

Figure 2:
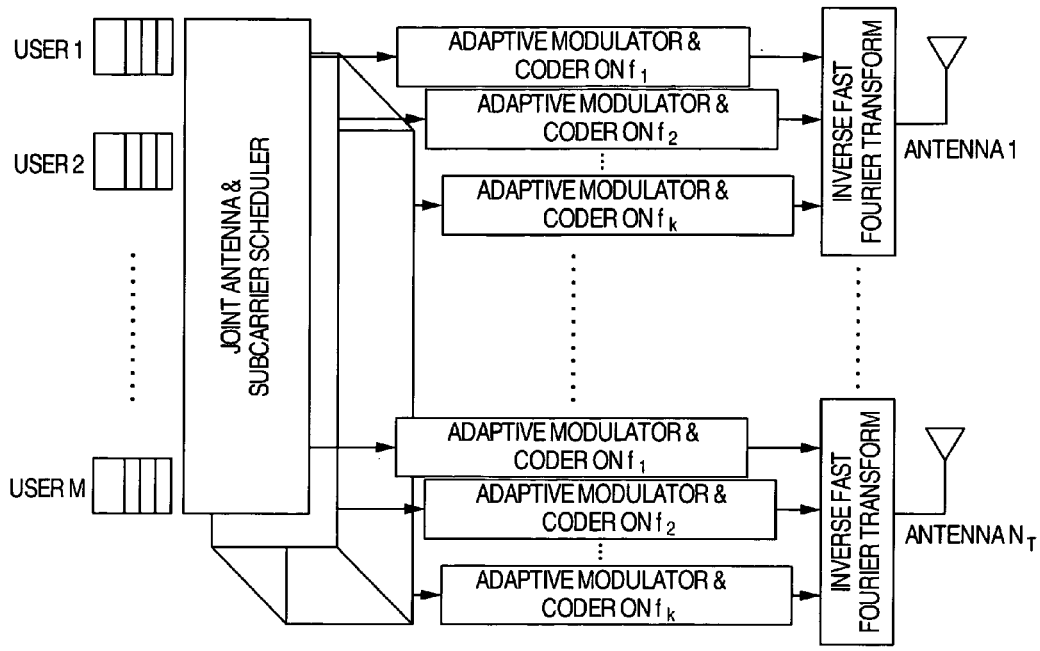
FIG. 2 shows an integrated MIMO/OFDM system configuration of the present invention and an AMC (Adaptive Modulation and Coding) scheduler.

FIG. 2 shows an integrated MIMO-OFDM system configuration of the present invention and an AMC (Adaptive Modulating Coding) scheduler. More specifically, the drawing shows an integrated MIMO-OFDM system configuration having an AMC (Adaptive Modulating Coding) scheduler.

$N_T$ inverse fast Fourier transformations for antennas 1 to $N_T$ are subject to outputs of the adaptive modulation coding devices on f1 to fk for OFDM modulation, and then are transmitted from the antennas 1 to $N_T$. Accordingly, a total of $N_T K$ radio resources exist. An antenna subcarrier scheduler schedules allocation of the above radio resources to data required to be transmitted by users 1 to M.

In channel allocation, the user is required to estimate a channel state and to feed the estimated information back to a transmitter. A clear different point between MIMO and OFDM channels is that a crosstalk phenomenon is always present between different antennas in the MIMO channel; whereas, no crosstalk is present between subcarriers in the OFDM channel.

In the MIMO system, $N_R$ reception antennas simultaneously receive $N_R$ duplication signals from one transmission antenna. This is a merit inherent in the MIMO system, called reception diversity. The reception diversity can remarkably improve the performance of the MIMO system. In the OFDM system, on the other hand, such crosstalk is removed by the orthogonality between subcarriers and repeating prefix. Therefore, when viewed from the side of the receiver, it is insufficient to estimate channel gains of $N_T K$ parallel subchannels on the basis of channel matrix $H^{(i)}$. This is because only channel gains from the $n_T$-th transmission antenna to the $n_R$-th reception antenna on the k-th subcarrier group are defined. The user's attention is focused only on the channel state of a usable transmission subchannel. Thus, when the user i defines the channel gain of the $n_T$-th transmission antenna on the k-th subcarrier group, the user is necessarily required to also take the reception diversity into consideration together. Accordingly, explanation will be made as to a characteristic of channel gain using the processed SNR of the receiver.

Mathematic description will next be made. In an actual system, a receiver tracks CSI through a pilot code. For representation simplicity, when an idle frequency channel gain is computed, an index number in a subcarrier group is denoted by subscript k, and a computation expression for a specific subcarrier group k is derived. $S_K$ denotes a column vector of an $N_T$ dimensional pilot signal transmitted with the subcarrier group k by the base station, and indicates a channel matrix of the subcarrier group k of the user i using a channel matrix $H_K^{(i)}$ of $N_R \times N_T$. An element (p,q) in $H_K^{(i)}$ is $d_k^{(i)(p,q)}$ in the above equation (3). Hence, the above equation (2) is rewritten to an equation (4) which follows.

$$x_k^{(i)} = H_k^{(i)} s_k + n_k^{(i)} \quad (4)$$

In the above equation (4), $x_k^{(i)}$ and $n_k^{(i)}$ are $N_R$ dimensional vectors, $n_k^{(i)}$ denotes additional channel noise, and its element is a complex Gaussian random variable of an independent normal distribution having an average value of 0 and a variance of $N_0$.

In order to restore a transmission signal, the receiver multiplies a reception weight matrix $G_k^{(i)}$ of one $N_T K \times N_R K$ by the received signal. Arrangement of the matrix $G_k^{(i)}$ is associated with the type of the receiver. When the receiver employs a ZF (Zero Forcing) detection method to de-multiplex the spatially multiplexed signal, the corresponding reception weight matrix $G_k^{(i)}$ is expressed by an equation (5) which follows.

$$G_k^{(i)} = H_k^{(i)H}(H_k^{(i)} H_k^{(i)H})^{-1} \quad (5)$$

In the above equation (5), $(i)^H$ indicates conjugate transpose. With respect to an MMSE (Minimum Mean-Square Error) receiver, the corresponding reception weight matrix $G_k^{(i)}$ is written by an equation (6) which follows.

$$G_k^{(i)} = H_k^{(i)H}(H_k^{(i)} H_k^{(i)H} + N_0/E_s I_{N_R})^{-1} \quad (6)$$

In the above equation (6), $N_o$ and $E_s$ indicate a full noise power and a full signal power respectively. The format of a de-multiplexed signal is given by an equation (7) which follows.

$$Y_k^{(i)} = G_k^{(i)} x_k^{(i)} = G_k^{(i)} H_k^{(i)} s_k + G_k^{(i)} n_k^{(i)} \quad (7)$$

Thus the processed SNR of a multiplexing flow is written by an equation (8) which follows.

$$SNR_{k,N_T}^{(i)} = \frac{|g_{k,n_T}^{*(i)} h_{k,n_T}^{(i)}|^2}{N_0 \|g_{k,n_T}^{*(i)}\|^2 + \sum_{j \neq n_T} |g_{k,n_T}^{*(i)} h_{k,j}^{(i)}|^2} \quad (8)$$

where, $n_T$ is an index number for a reception antenna, $g_{k,n_T G}^{*(i)}$ indicates the $n_T$-th row of $G_k^{(i)}$, and $h_{k,n_T}^{(i)}$ indicates the $n_T$ column of $H_k^{(i)}$.

According to A. F. Molisch, M. Z. Win and J. H. Winters "Space-time-frequency (STF) coding for MIMO-OFDM system" IEEE Communications Letters, Vol. 6, September 2002, pp. 370-372; in a multi-dimensional resource scheduling, $N_T K$ independent data flows are regarded as $N_T K$ parallel transmission subchannels. These subchannels are evaluated using the processed SNR from the side of the receiver. From intuitive understanding, an antenna may be regarded as an added subcarrier group or subcarrier group may be regarded as an added antenna, regardless of whether or not the antenna and the subcarrier group are distinguished from a different subcarrier group or from a different antenna. Thus, the above equivalent relation is obtained. A channel for the k-th subcarrier group and the $n_T$-th transmission antenna can be denoted by subchannels having a general index number c. The user i evaluates the $N_T K$ transmission subchannels using $SNR_c^{(i)}$.

Figure 3:
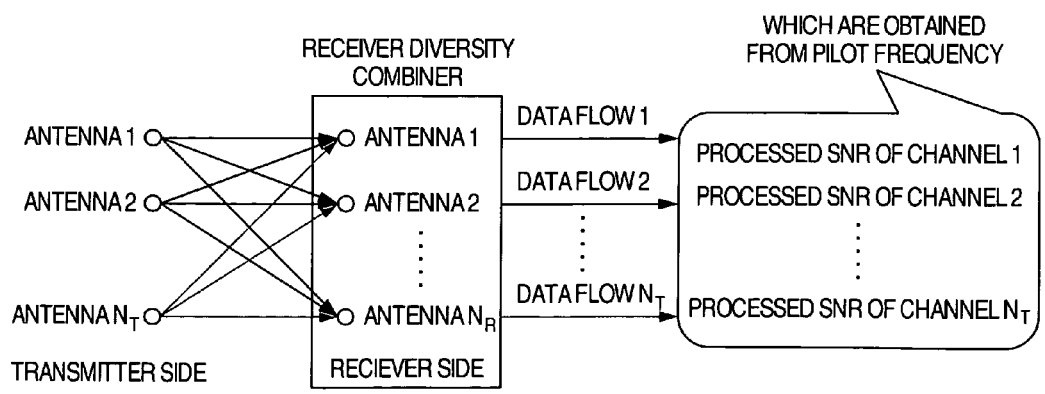
FIG. 3 schematically shows reception diversity of the present invention and evaluation of subchannels of MIMO channels.

FIG. 3 is a diagram for intuitively explaining all processes. More specifically, FIG. 3 schematically shows the reception diversity of the present invention and the subchannel evaluation of MIMO channels.

Signals transmitted from the antennas 1 to $N_T$ and received at the antennas 1 to $N_R$ are converted to data flows 1 to $N_T$ by a reception diversity combiner at the of the receiver. At this time, processed SNR's of the channels 1 to $N_T$ are obtained by referring to the pilot signal.

When the adaptive modulation and coding AMC is used for all the subchannels based on the channel state information CSI, a capacity value for the processed SNR is indicated by a supportable data transmission rate SDR. In such an environment, the transmitter of the base station and the receiver of the user both maintain a sheet of adaptive modulation and coding AMC specification table. The receiver, on the basis of the received SNR, feeds the pattern ID of the adaptive modulation and coding AMC selected after determination of the adaptive modulation and coding AMC back to the transmitter of the base station.

As mentioned above, the evaluation of the channel state may be made by feeding only the pattern ID of the adaptive modulation and coding AMC back to the transmitter. It is unnecessary to feed an entire CSI matrix having a complex Gaussian variable back to the transmitter. As a result, the amount of calculation done by the system can be reduced and a communication cost can also be reduced. Table 1 below is an example of an AMC specification table having a channel bandwidth of 100 kHz.

TABLE 1

Specification table of adaptive modulation and coding AMC (at channel frequency bandwidth of 100 kHz)

| Pattern ID | SNR(dB) | Modulation | Code rate | Capacity (bps/Hz) | SDR(kbps) |
|---|---|---|---|---|---|
| 1 | -3.4 | BPSK | 1/4 | 0.25 | 25 |
| 2 | -0.4 | BPSK | 1/2 | 0.5 | 50 |
| 3 | 2.2 | QPSK | 1/2 | 1 | 100 |
| 4 | 5.2 | QPSK | 3/4 | 1.5 | 150 |
| 5 | 7.6 | 8PSK | 2/3 | 2 | 200 |
| 6 | 10.9 | 16QAM | 3/4 | 3 | 300 |
| 7 | 14.5 | 64QAM | 2/3 | 4 | 400 |

The present invention proposes a method for allocating subchannels in an MIMO-OFDM wireless network on the basis of the above system model. The gist of the present invention is firstly to support the requirement of multimedia user's QoS and secondly to effectively use radio resources in the MIMO-OFDM network.

For the purpose of supporting multimedia user's QoS at a higher resource utilization rate while taking the features of the radio channel and the utilization of multi-dimensional radio resources, the present invention has three featured points which follow, in summary.

Firstly, consideration should be paid to the state of each subchannel for each user. For each subchannel, one of users having a highest channel gain is selected for data transmission. Accordingly, there is a possibility that spatial diversity, frequency diversity, and multi-user diversity are used.

Secondly, in order to distinguish services among users, the channel states of the users are required to be shown by specific different QoS parameters regardless of the channel states. In other words, fairness must be ensured among users having the same QoS parameter. Different services are required to be provided to users with different QoS parameters.

Thirdly, this method is required to be easily implemented. The key of this point is to reduce an amount of calculation and a communication cost by utilizing minimum, and most effective channel state information fed back.

Based on the aforementioned examination, explanation will be made as to a frequency spectrum based on generalized processor sharing (GPS) and how to utilize it in spatial resource joint management. The GPS is an ideal fair scheduling method based on flows. This method is assumed that a plurality of users can receive services at the same time according to preset weights. In recent years, papers relating to GPS and a study of simulation of its packets are published. The papers include J. C. R. Bennett, H. Zhang "WF2Q: worst-case fair weighted fair queuing" IEEE INFOCOM conference, Vol. 1, March 1996, pp. 120-128.

The parallel characteristic of the GPS is highly suitable for an MIMO-OFDM system which allows a plurality of users to simultaneously receive services by utilizing different spaces and frequency subchannels. This is also one of reasons why we study the GPS type scheduling method in the MIMO-OFDM system of the present invention.

In order to apply the GPS scheduling, it is first assumed that the number K of subcarrier groups is sufficiently large so that subchannels in a given small frequency band can be allocated. Thus, a subchannel distribution can be defined as a continuous function. $\rho_i(s)$ is used as a binary time shared factor for the s-th subchannel, and is used to indicate whether or not the user i is using the s-th subchannel. That is, in $s \in [0, N_T W]$ equation, W denotes a total bandwidth for each OFDM modulation block. Accordingly, the usable bandwidth of the entire system is $N_T W$ and $\rho_i(s)$ is given by an equation (9) which follows.

$$\rho_i(s) = \begin{cases} 1: & \text{when the } s\text{-th subchannel is used by} \\ & \text{user } i \\ 0: & \text{others} \end{cases} \quad (9)$$

One subchannel can be allocated to only one user. In other words, different users are inhibited from sharing one subchannel in the same time zone. That is, this results in an equation (10) which follows.

$$\sum_{i=1}^{M} \rho_i(s) = 1 \;\forall\, s \in [0, N_T W) \quad (10)$$

In one GPS node, call admission control (CAC) interprets a minimum allowable data transmission rate $R_i$ required by the i-th user as a corresponding weight $\phi_i$. This purpose is to maximize the throughput c of the entire system under a predetermined weight restriction. Most preferable resource management can be explained by an equation (11) which follows.

$$\begin{cases} \max_{\rho_i(s)} C = \max_{\rho_i(s)} \sum_{i=1}^{M} \int_0^{N_T W} SDR_s^{(i)} \rho_i(s)\, ds \\ \text{subject to:} \\ \dfrac{\int_0^{N_T W} SDR_s^{(i)} \rho_i(s)\, ds}{\phi_i} = \dfrac{\int_0^{N_T W} SDR_s^{(j)} \rho_j(s)\, ds}{\phi_j} \quad i,j \in B \\ \sum_{i \in B} \rho_i(s) = 1 \quad \forall\, s \in [0, N_T W) \end{cases} \quad (11)$$

The optimization is ideal GPS scheduling. The parallel transmission characteristic of the MIMO-OFDM is highly suitable for the ideal GPS scheduling. In an actual MIMO-OFDM system, however, code transmission is carried out in entity format as conventional. The entire bandwidth and the transmission code cannot be infinitely divided. The present invention provides a modified proportional fairness scheduling method which is suitably used in a parallel channel scheduling environment on the basis of an actual MIMO-OFDM system.

The present invention provides a subchannel allocation scheduling method of weighted proportional fairness (WPF). By the GPS scheduling method, a minimum allowable data transmission rate of each user subscribed in the system is first interpreted as a relative weight between users, and is denoted by $\phi_i$. When the user having a minimum allowable data transmission rate of, e.g., 1 Mbps has a weight of 1; a user having a minimum allowable data transmission rate of 2 Mbps has a weight of 2, and so on. In each subchannel, the transmitter of the base station, on the basis of the pattern ID of the adaptive modulation and coding AMC fed back from each user, examines a data transmission rate $SDR_c^{(i)}$ which the current c-th subchannel supports for the user i. The scheduler tracks an average throughput $T_i$ of users in a window having a past length $t_c$. When the scheduler tries to transmit the next data packet, the device selects one of all active users of the entire system having a maximum value of an equation (12) which follows for transmission, and then allocates the subchannel c to the user i.

$$\dfrac{\phi_i SDR_c^{(i)}}{T_i} \quad (12)$$

A difference from the conventional proportional fairness scheduling method is that the present invention includes user's weight $\phi_i$. More specifically, an quantity of service obtained by a user is not only directly proportional to a data transmission rate supported by a forward link of the user in question, that is, to a channel gain, but the service quantity is also directly proportional to a data transmission rate required by the user. And at the same time, the service quality is inversely proportional to an average throughput. For this reason, this method is called a weighted proportional fairness scheduling method.

After each scheduling interval 1, an average throughput $T_i$ is updated by an index weighted low pass filter according to an equation (13) given below until all subchannels are allocated.

$$T_i^{(i)} = \begin{cases} \left(1 - \dfrac{1}{t_c}\right) T_i^{(i-1)} + \dfrac{1}{t_c} SDR_c^{(i)} & \text{user } i \text{ is scheduled.} \\ \left(1 - \dfrac{1}{t_c}\right) T_i^{(i-1)} & \text{user } i \text{ is not scheduled.} \end{cases} \quad (13)$$

In the conventional proportional fairness scheduling method, only one user is scheduled in one time slot. Unlike the conventional method, according to the scheduling method of the present invention, a plurality of subchannels are required to be allocated on each subchannel basis in each scheduling time slot in one parallel transmission system. Accordingly, a plurality of users can receive services in one scheduling time slot, and one user can obtain a plurality of subchannels.

In such circumstances, the average throughput $T_i$ can be updated by two methods for each user. In the first method, in one scheduling time slot, all users first compete for one subchannel, and subsequently before the users compete for the next subchannel, the throughput $T_i$ is quickly updated until all subchannels are allocated. In the other second method, in one scheduling time slot, the user updates it after all the subchannels are allocated by using the constant average throughput $T_i$.

The first method is carefully devised to ensure fairness. But instead of its price, this method is clearly complex in a high degree of calculation. A result of its simulation indicates that, on the assumption that the unit of resource allocation is relatively rough, there is no substantial difference in performance between the first and second methods. In an actual system, the unit of resource allocation is not so fine. Accordingly the selection of the second method is relatively preferable.

The method of the present invention will be explained in detail. In each scheduling time slot, the scheduler executes a procedure which follows.

Step 1: The base station checks $SDR_c^{(i)}$ for each user and put them in a matrix in an equation (14) which follows, by examining a pattern table of the adaptive modulation and coding AMC on the basis of the pattern ID of the adaptive modulation and coding AMC fed back from the users in each channel. The first-row elements in the equation Γ correspond to data transmission rates supportable for the channels 1, 2, ..., and $N_T K$ of the user 1. Similarly, the last-row elements in the equation Γ correspond to data transmission rates supportable for the channels 1, 2, ..., and $N_T K$ of the user M.

$$\Gamma = \begin{bmatrix} SDR_1^{(1)} & SDR_2^{(1)} & \ldots & SDR_{N_T K}^{(1)} \\ SDR_1^{(2)} & SDR_2^{(2)} & \ldots & SDR_{N_T K}^{(2)} \\ \ldots & \ldots & \ldots & \ldots \\ SDR_1^{(M)} & SDR_2^{(M)} & \ldots & SDR_{N_T K}^{(M)} \end{bmatrix} \quad (14)$$

Step 2: $\phi_i SDR_c^{(i)}/T_i$ for each element in the equation Γ is calculated. In the equation, $\phi_i$ is the weight of the user i, and $T_i$ is an average throughput of the user i in the time slot sliding window.

Step 3: A maximum of $\phi_i SDR_c^{(i)}/T_i$ is selected and subchannels of the corresponding column number in the equation Γ are allocated to users having the corresponding row number.

Step 4: The corresponding column in the equation Γ is deleted.

Step 5: Control is returned to the step 3 until all columns in the equation Γ are deleted.

Step 6: Using an equation (15), $T_i$ is updated for each user.

$$T_i^{(i)} = \left(1 - \frac{1}{t_c}\right) T_i^{(i-1)} + \frac{1}{t_c} \sum_{c=1}^{N_T K} SDR_c^{(i)} \rho_i(c) \quad (15)$$

In the above equation (15), $\rho_i(c)$ indicate whether or not a subchannel c is being used by the user i.

For the purpose of explaining the process of the calculation method more intuitively, a simple case is taken. In a 2×2 MIMO system, OFDM subchannels are divided into four groups of subfrequency bands each having a bandwidth of 100 Hz. Accordingly, the system includes $N_T K$ (=2×4=8) independent transmission data flows, and each subchannel transmission bandwidth is 100 kHz. Four-multimedia users are subscribed in the system, and the minimum allowable data transmission rates required by the respective multimedia users are 100 kbps, 200 kbps, 300 kbps, and 400 kbps, respectively. Therefore, the respective multimedia users are interpreted to have weights, $\phi_1=1$, $\phi_2=2$, $\phi_3=3$, and $\phi_4=4$, respectively.

SNR's of the channels 1 to 8 monitored by the user 1 using the pilot signal are 11.63, 8.61, 14.96, 10.56, 14.49, 5.53, 8.54, and 9.81, respectively. For the sake of notation simplicity, SMR's of each channel monitored by four users are previously put in a single SMR matrix, as shown in an equation (16) which follows.

$$SNR = \begin{bmatrix} 11.63 & 8.61 & 10.56 & 5.53 & 9.81 & 0.71 & 7.64 & -2.47 \\ 8.59 & 3.60 & 7.36 & 3.09 & 2.88 & 10.03 & 2.61 & 13.35 \\ 10.81 & 6.99 & 10.59 & 6.74 & 9.52 & 14.55 & 8.11 & 6.76 \\ 11.67 & 6.40 & 10.05 & 2.31 & -0.42 & 5.03 & 9.92 & -1.42 \end{bmatrix} \quad (16)$$

In the SNR matrix, an element at the i-th row and at the j-th column corresponds to the SNR monitored by the i-th user of the j-th channel.

Each user, on the basis of the AMC specification table (shown in Table 1) stored in his own PC, feeds the monitored SNR related to its pattern ID back to the base station. Similarly, for the sake of convenience, the fed-back information are arranged in a matrix CSI as shown by an equation (17) which follows.

$$CSI = \begin{bmatrix} 6 & 5 & 5 & 4 & 5 & 2 & 5 & 1 \\ 5 & 3 & 4 & 3 & 3 & 5 & 3 & 6 \\ 5 & 4 & 5 & 4 & 5 & 7 & 5 & 4 \\ 6 & 4 & 5 & 3 & 1 & 3 & 5 & 1 \end{bmatrix} \quad (17)$$

An element in the CSI matrix at the i-th row and at the j-th column corresponds to an AMC pattern ID employable for the j-th channel fed back by the i-th user.

The base station obtains information CSI fed back from each user, examines Table 1 to obtain a data transmission rate SDR supportable to each channel of each user, and previously puts these data transmission rates in a matrix F given by an equation (18) which follows.

$$\Gamma = \begin{bmatrix} 300 & 200 & 200 & 150 & 200 & 50 & 200 & 25 \\ 200 & 100 & 150 & 100 & 100 & 200 & 100 & 300 \\ 200 & 150 & 200 & 150 & 200 & 400 & 200 & 150 \\ 300 & 150 & 200 & 100 & 25 & 100 & 200 & 25 \end{bmatrix} \quad (18)$$

Assuming that each user has an initial value $T_i^{(0)}=100$, then the base station calculates $\phi_i SDR_c^{(i)}/T_i$ for each element in the matrix Γ to obtain such a result as shown by an equation (19) as follows.

$$\begin{bmatrix} \frac{1 \times 300}{100} & \frac{1 \times 200}{100} & \frac{1 \times 200}{100} & \frac{1 \times 150}{100} & \frac{1 \times 200}{100} & \frac{1 \times 50}{100} & \frac{1 \times 200}{100} & \frac{1 \times 25}{100} \\ \frac{2 \times 200}{100} & \frac{2 \times 100}{100} & \frac{2 \times 150}{100} & \frac{2 \times 100}{100} & \frac{2 \times 100}{100} & \frac{2 \times 200}{100} & \frac{2 \times 100}{100} & \frac{2 \times 300}{100} \\ \frac{3 \times 200}{100} & \frac{3 \times 150}{100} & \frac{3 \times 200}{100} & \frac{3 \times 150}{100} & \frac{3 \times 200}{100} & \frac{3 \times 400}{100} & \frac{3 \times 200}{100} & \frac{3 \times 150}{100} \\ \frac{4 \times 300}{100} & \frac{4 \times 150}{100} & \frac{4 \times 200}{100} & \frac{4 \times 100}{100} & \frac{4 \times 25}{100} & \frac{4 \times 100}{100} & \frac{4 \times 200}{100} & \frac{4 \times 25}{100} \end{bmatrix} = \quad (19)$$

$$\begin{bmatrix} 3 & 2 & 2 & 1.5 & 2 & 0.5 & 2 & 0.25 \\ 4 & 2 & 3 & 2 & 2 & 4 & 2 & 6 \\ 6 & 4.5 & 6 & 4.5 & 6 & 12 & 6 & 4.5 \\ 12 & 6 & 8 & 4 & 1 & 4 & 8 & 1 \end{bmatrix}$$

In the equation (19), an maximum value of elements in each column is searched for. A maximum value of elements in the first column is 12 that corresponds to the fourth user. That is, the first channel is allocated to the fourth user. Similarly, a maximum value of elements in the second column is 6 that corresponds to the fourth user. The second channel is allocated to the fourth user. A result of channel allocation done in this way is as follows.

First user:
Second user: channel 8
Third user: channel 4, channel 5, channel 6
Fourth user: channel 1, channel 2, channel 3, channel 7 $T_i$ is updated (assuming $t_c$=200)

$$T_1^{(1)} = \left(1 - \frac{1}{200}\right) T_1^{(0)} = 99.5 \tag{20}$$

$$T_2^{(1)} = \left(1 - \frac{1}{200}\right) T_2^{(0)} + \frac{1}{200} \times 300 = 101$$

$$T_3^{(1)} = \left(1 - \frac{1}{200}\right) T_3^{(0)} + \frac{1}{200} \times (150 + 200 + 400) = 103.25$$

$$T_4^{(1)} = \left(1 - \frac{1}{200}\right) T_4^{(0)} + \frac{1}{200} \times (300 + 150 + 200 + 200) = 103.75$$

The scheduling process for the 0-th time slot has been completed at this stage.

Thereafter, the user, on the basis of the pilot signal of the next scheduling unit, monitors the SNR of each channel and continues the calculation of the equation (15) until the scheduling of the next time slot is completed.

The effects of the present invention will next be explained.

The present invention evaluates the performance of the Weighted Proportional Fairness (WPF) scheduling method proposed based on computer simulation. In the simulation, subcarriers for the OFDM system are 16 groups, and four transmission antennas and four reception antennas are used in the MIMO system. In the simulation, ZF and MMSE receivers are employed. Adaptive modulation and coding AMC specifications of Table 1 are applied through the processed SNR values.

Figure 4:
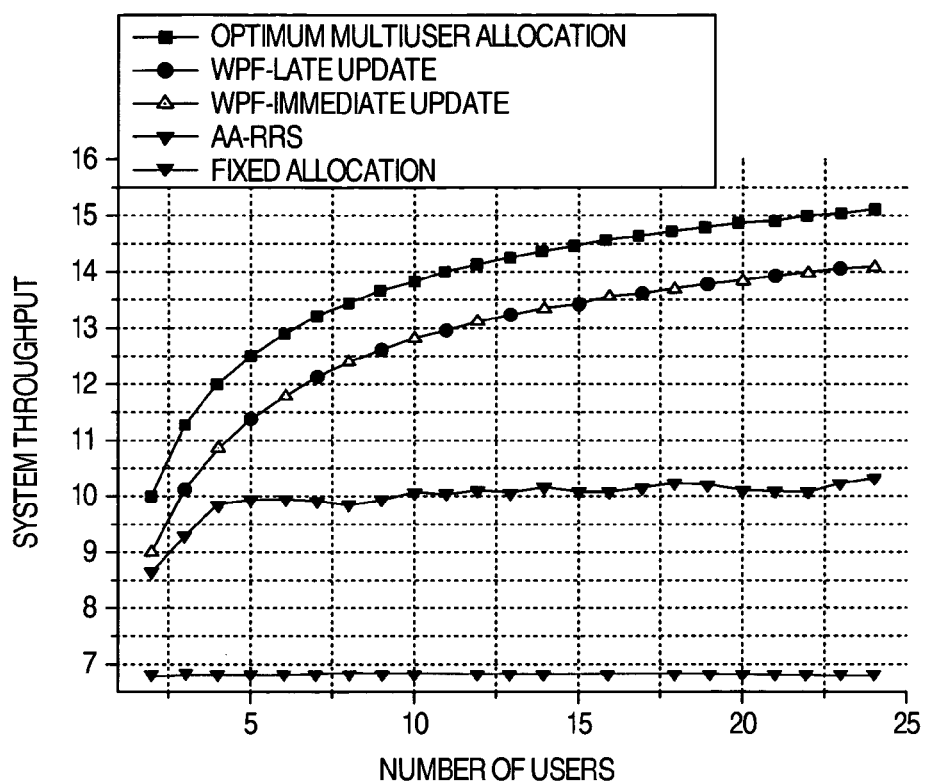
FIG. 4 shows a relation between the system average throughput of a ZF (zero forcing) receiver and the number of users.
Figure 5:
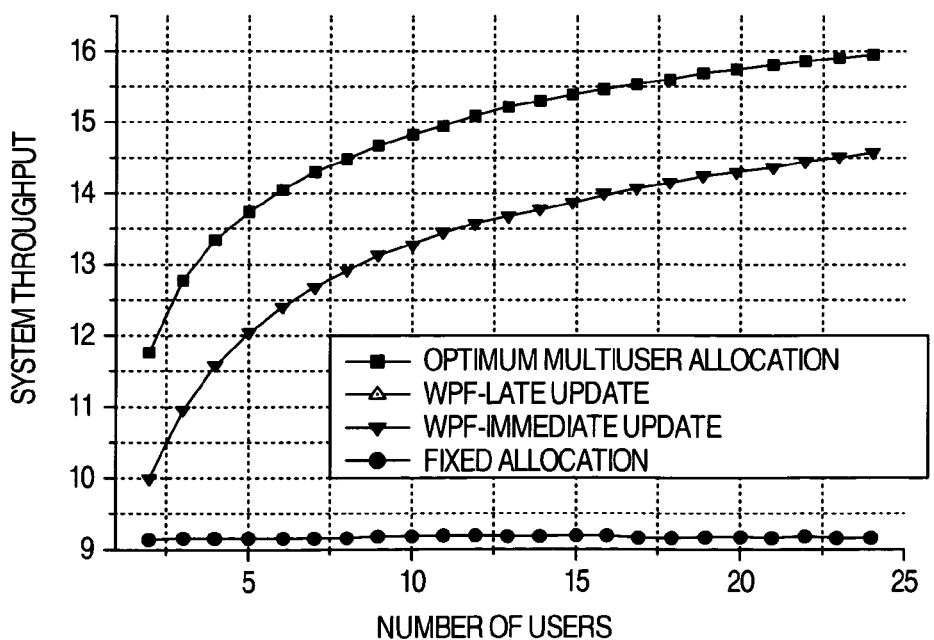
FIG. 5 shows a relation between the system average throughput of an MMSE receiver and the number of users.

FIG. 4 shows a relation between a system average throughput of a ZF receiver and the number of users. FIG. 5 shows a relation between a system average throughput of a MMSE receiver and the number of users.

FIGS. 4 and 5 are curves of system total average throughput normalized by system bandwidth when the number of users is varied from 2 to 24 under conditions that all users have the same weight value and an average reception SNR be 10 dB. The ZF receiver is used in FIG. 4, while the MMSE receiver is used in FIG. 5. Comparison was made even between a system capacity having a fixed subchannel allocation and a system capacity having an optimum multi-user diversity paying no consideration to fairness.

These drawings indicate that the system throughput is increased as the number of users increase in the WPF method, whereas, the system throughput is not increased as the number of users increases in the fixed subchannel allocation method. When compared with the allocation method having the optimum multi-user diversity, the system throughput is somewhat decreased by the restriction of fairness in the method of the present invention. The simulation comparison was also carried out even on antenna-assisted Round Robin scheduling (AA-RRS) proposed by O. S. Shin and K. Lee "Antenna-assisted round robin scheduling for MIMO cellular systems", IEEE Communications Letters, Vol. 7, March 2003, pp. 109-111. As a result, it has been found that an increase in the throughput of a system employing the AA-RRS method is not remarkable beyond the above case after the number of users reaches 5. In the methods of the present invention, when the method employing frequency scheduling together is compared in performance improvement with the method employing only spatial scheduling, the former generates a frequency gain. When the above comparison is applied to two receivers for example, the immediate updating of the WPF method has substantially the same performance as the somewhat-late updating thereof. The drawings support the above conclusion.

FIG. 6 shows a fairness comparison. More specifically, FIG. 6 shows a throughput allocation comparison in various situations of the present invention. FIG. 6 shows the fairness of the WPF method for somewhat-late updating on the basis of a throughput in one scheduling time slot of each user.

Assuming that the weights of four users waiting for scheduling are $\phi_1 \phi_2 = 1$, and $\phi_3 \phi_4 = 2$ respectively, an average throughput (in this example, $t_c$ being set at 200) of each user was calculated in a scheduling time slot having a past window length $t_c$. As illustrated, the throughput of each user is basically directly proportional to its weight, except for small variations caused by the fluctuations of the channel state. Accordingly, the method of the present invention can obtain fair performance as in the GPS scheduling.

In accordance with the present invention, a weighted proportional fairness scheduling is proposed. The method can maximize the down-transmission system throughput of a multi-user MIMO-OFDM system on the basis of the restricted fed-back CSI. The gist of the invention is as follows.

In the MIMO-OFDM wireless network, all subchannels were allocated using the GPS type scheduling specifications. The proposed scheduling specifications can ensure a minimum data transmission rate required by a multimedia user, and can effectively use radio resources by using the frequency diversity and the multi-user diversity at the same time.

Based on the ideal GPS scheduling method, an improvement in the conventional proportional fairness scheduling method was proposed. The method of the present invention can be applied to parallel transmission subchannels and can simultaneously support users having a plurality of different weights. The method can attain substantially the same fairness as in the ideal GPS specifications.

It is the adaptive modulation and coding pattern ID, not the entire CSI matrix having complex Gaussian variables, that is fed back as channel state information. As a result, the communication cost can be reduced to a large extent.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for allocating subchannels in a wireless network wherein a plurality of users are subscribed in the wireless network, a base station has $N_T$ transmission antennas, a user i has $N_R$ reception antennas, a network capacity determined by the $N_T$ transmission antennas and K subcarrier groups is divided into K transmission subchannel groups, and a network bandwidth determined by the $N_T$ transmission antennas is divided into the K subchannel groups;

wherein the base station sequentially allocates channels to the plurality of users on the basis of a proportional value of a data transmission rate supported to each user and an average throughput of each user in a predetermined time and a service quality required by each user, wherein a desired service quality of said each user is a minimum allowable data transmission rate of the user;

the method comprising:

a step (a) of calculating a relative weight between the users by said base station on the basis of a minimum allowable data transmission rate $\phi_i$ of each user subscribed in the system in each predetermined time slot 1;

a step (b) of calculating $\phi_i SDR_c^{(i)}/T_i$ for all the users of the entire system by said base station on the basis of a data transmission rate $SDR_c^{(i)}$ supported from the user i of a current c-th subchannel and an average throughput $T_i$ of each user in a window having a predetermined past length $t_c$;

a step (c) of selecting the user i having a maximum value of $\phi_i SDR_c^{(i)}/T_i$ and allocating the subchannel c to the user i by the base station; and a step (d) of executing said steps (a) to (c) for all channels by the base station.

2. A method according to claim 1, wherein the weight $\phi_i$ of said user is calculated and stored by said base station and is used as a scheduling weight coefficient.

3. A method according to claim 2, wherein the user determines a pattern of adaptive modulation and coding (AMC) on the basis of a received signal-to-noise ratio SNR, and feeds the pattern ID of the selected AMC pattern back to the base station.

4. A method according to claim 2, wherein the user feeds only the AMC pattern ID back to the base station to use it as channel state information.

5. A method according to claim 1, wherein, in said step (b), said base station determines said $SDR_c^{(i)}$ using a correlation between a pattern ID in a pattern table of adaptive modulation and coding (AMC) and said $SDR_c^{(i)}$ on the basis of the pattern ID fed back from each user.

6. A method according to claim 1, wherein said pattern table of adaptive modulation and coding (AMC) is held by both the base station and the user.

7. A method according to claim 6, wherein the updating of said average throughput $T_i$, is carried out according to an equation, $$T_i^{(i)} = \left(1 - \frac{1}{t_c}\right) T_i^{(i-1)} + \frac{1}{t_c} \sum_{c=1}^{N_T K} SDR_c^{(i)} \rho_i(c)$$

wherein, $\rho_i(c)$ indicates whether or not the subchannel is being used by the user i.

8. A method according to claim 1, wherein said base station updates said average throughput $T_i$, until all subchannels are allocated after each predetermined time slot 1.

9. A method according to claim 1, wherein when the number of users in the network is M, the data transmission rate $SDR_c^{(i)}$ supported for the user i of the entire subchannels forms a matrix equation $\Gamma$ which follows, said base station calculates $\phi_i SDR_c^{(i)}/T_i$, for each element in the equation $\Gamma$ in said step (b); the base station selects a maximum value of $\phi_i SDR_c^{(i)}/T_i$, allocates subchannels having a corresponding column number in the equation $\Gamma$ to users having a corresponding row number in the equation $\Gamma$, and then deletes a corresponding column in the equation $\Gamma$ in said step (c); and the base station returns to said step (c) until all columns are deleted in the equation $\Gamma$ in said step (d), $$\Gamma = \begin{bmatrix} SDR_1^{(1)} & SDR_2^{(1)} & \ldots & SDR_{N_T K}^{(1)} \\ SDR_1^{(2)} & SDR_2^{(2)} & \ldots & SDR_{N_T K}^{(2)} \\ \ldots & \ldots & \ldots & \ldots \\ SDR_1^{(M)} & SDR_2^{(M)} & \ldots & SDR_{N_T K}^{(M)} \end{bmatrix}$$

wherein, elements in the i-th row in the matrix equation corresponds to data transmission rates supportable for the user i of channels 1 to $N_T K$.

10. A method according to claim 1, wherein said wireless network is a wireless cellular network.

11. A method according to claim 1, wherein said wireless network employs techniques of orthogonal frequency division multiplexing (OFDM) and multiple-input multiple-output (MIMO).

* * * * *

UNITED STATES PATENT AND TRADEMARK OFFICE
CERTIFICATE OF CORRECTION

Page 1 of 1

PATENT NO. : 7,889,758 B2
APPLICATION NO. : 11/209739
DATED : February 15, 2011
INVENTOR(S) : Li et al.

It is certified that error appears in the above-identified patent and that said Letters Patent is hereby corrected as shown below:

Item (73), should read as follows:

(73)   Assignee:   Hitachi, Ltd., Tokyo (JP) and
Tsinghua University, Beijing (CN)

Signed and Sealed this
Second Day of August, 2011

David J. Kappos
*Director of the United States Patent and Trademark Office*